(12) United States Patent  
Lota

(10) Patent No.: US 7,658,432 B2
(45) Date of Patent: Feb. 9, 2010

(54) INSTRUMENT PANEL WITH TEMPORARY ATTACHMENT STRUCTURE

(75) Inventor: Charan Singh Lota, Canton, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 11/970,756

(22) Filed: Jan. 8, 2008

(65) Prior Publication Data

US 2009/0174215 A1 Jul. 9, 2009

(51) Int. Cl.
*B62D 25/14* (2006.01)
(52) U.S. Cl. ...................................... 296/70
(58) Field of Classification Search ............ 296/70, 296/29; 180/90; 403/DIG. 10
See application file for complete search history.

(56) References Cited

U.S. PATENT DOCUMENTS

| | | | |
|---|---|---|---|
| 4,372,410 A * | 2/1983 | Loken et al. ............. 180/89.12 |
| 4,717,195 A * | 1/1988 | Okuyama et al. ............. 296/72 |
| 4,875,273 A | 10/1989 | Yamamoto et al. |
| 4,876,786 A | 10/1989 | Yamamoto et al. |
| 4,969,249 A | 11/1990 | Yamamoto et al. |
| 5,005,898 A | 4/1991 | Benedetto et al. |
| 5,088,571 A | 2/1992 | Burry et al. |
| 5,477,603 A | 12/1995 | Kemichick |
| 5,712,764 A | 1/1998 | Baker et al. |
| 5,791,606 A * | 8/1998 | Blackburn ............. 248/27.1 |
| 5,919,058 A * | 7/1999 | Tashiro et al. ............. 439/374 |
| 6,729,681 B2 | 5/2004 | Yustick |
| 6,736,439 B2 | 5/2004 | Yasuta et al. |
| 6,883,230 B2 | 4/2005 | Matsumoto et al. |
| 6,895,647 B2 | 5/2005 | Matsumoto et al. |
| 6,918,169 B2 | 7/2005 | Mathew |
| 7,086,125 B2 * | 8/2006 | Slobodecki et al. ........... 24/295 |
| 7,168,145 B2 | 1/2007 | Sawada et al. |
| 2006/0037794 A1 * | 2/2006 | Riha ........................ 180/90 |

* cited by examiner

*Primary Examiner*—H Gutman
(74) *Attorney, Agent, or Firm*—Gifford, Krass, Sprinkle, Anderson & Citkowski, P.C.

(57) ABSTRACT

Disclosed herein is an instrument panel assembly affording for installment in a motor vehicle as one unit even though the assembly has a final width that is greater than a predetermined maximum width criterion for passing the assembly through a doorframe. The instrument panel assembly includes an instrument panel having a front side and a rear side, the front side having a temporary attachment structure and a permanent attachment structure. The assembly also includes an electronic panel with a temporary attachment structure and a permanent attachment structure, the electronic panel being operable to temporarily attach to the instrument panel in a position that affords for a reduced width of the instrument panel assembly. A process is also disclosed for installing an instrument panel assembly having an overall width that is greater than a predetermined maximum width criterion.

14 Claims, 6 Drawing Sheets

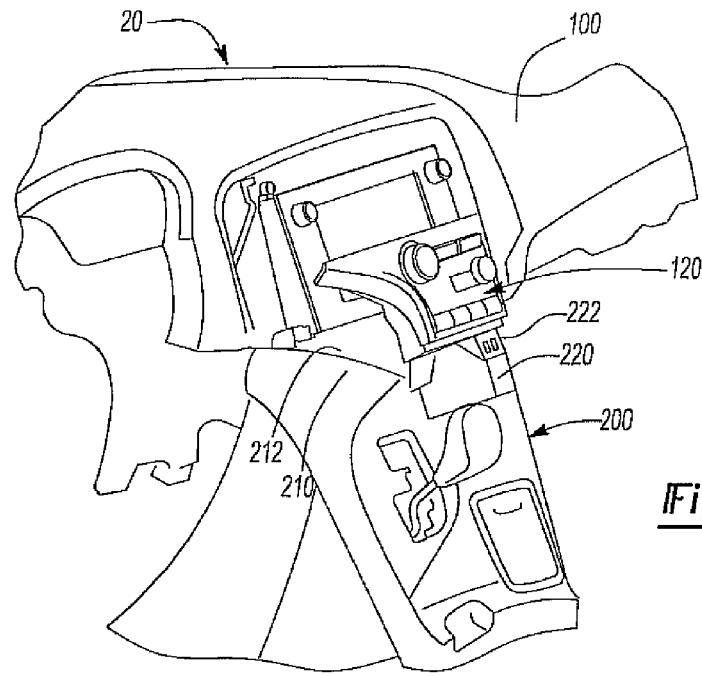
*Fig-10*
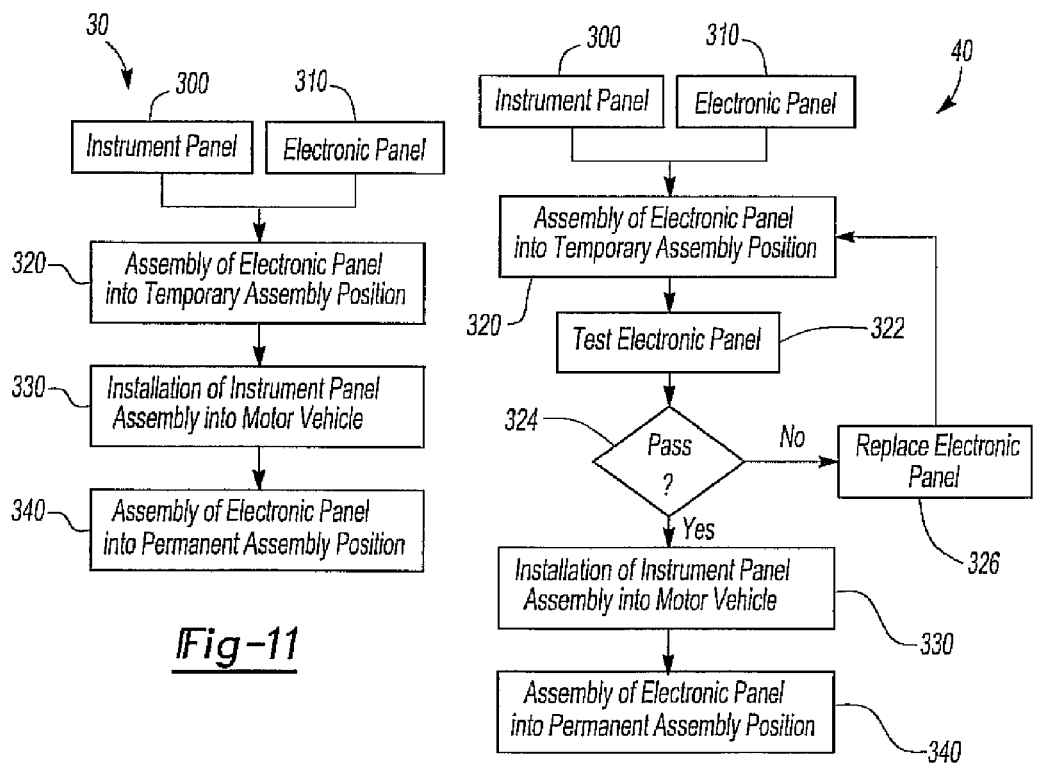
*Fig-11*
*Fig-12*

INSTRUMENT PANEL WITH TEMPORARY ATTACHMENT STRUCTURE

FIELD OF THE INVENTION

This invention relates generally to an instrument panel and a method of installing an instrument panel. More specifically, the invention relates to an instrument panel having a temporary attachment structure for an electronic panel to be attached thereto and a method for installing the instrument panel with the electronic panel temporarily attached thereto within a motor vehicle.

BACKGROUND OF THE INVENTION

Motor vehicles have included dashboards, also known as instrument panels, within the interior of the vehicle for decades. During much of this time, instrument panels such as the one shown in FIG. 1 generally at reference numeral 5, have included standard items such as a dash board 9, a panel 6 that included a speedometer, an oil gauge and the like, a heater, venting and air-conditioning (HVAC) control panel 7 and a radio panel 8. Such prior art panels have typically had a relatively narrow width W1 as shown in FIG. 2 relative to the width D1 of a front door opening, such that the instrument panel assembly 5 could be installed as one unit within the motor vehicle.

As motor vehicles, and in particular their electronic control systems become ever more complex, the components attached to an instrument panel continue to increase in size and number. In addition, the design or style of motor vehicles continues to change, with instrument panels incorporated with center consoles creating evermore complex and larger panels to be installed within the motor vehicle. An illustrative example of such an instrument panel assembly is shown generally at reference numeral 10 in FIG. 3. As shown in this figure, an instrument panel 100 can have a first electronic panel 110, and a second electronic panel 120 attached thereto. In addition, the instrument panel 100 can be designed such that a center console 200 having a variety of components—such as a storage compartment 210, a gear shifter lever 220, etc.—is attached to the instrument pane 100.

Although newer styled instrument panels provide for aesthetically pleasing interiors and new features such as navigation systems, such instrument panels have an increased width as shown by the dimension W2 in FIG. 4. The increase in the width of the instrument panel assembly 10 reduces free space e1 between the instrument panel assembly 10 and a doorframe 12 which the assembly 10 must pass through during installation.

A minimum spacing between the instrument panel assembly 10 and the doorframe 12 is typically demanded by production line standards in order to ensure that the instrument panel 100 and any components attached thereto are not be impacted, scraped, etc. during their installment through the doorframe 12. As one would expect, the stylistic design of some instrument panel assemblies do not meet this minimum space requirement and thus the motor vehicle manufacturer heretofore has been forced to redesign the instrument panel in order to reduce its width. In the alternative, the second electronic panel 120 has been installed or attached to the instrument panel 100 after the instrument panel 100 has been attached within the motor vehicle. However, the installation of the second electronic panel 120 after the instrument panel 100 has been installed within the motor vehicle can result in the entire instrument panel assembly 10 having to be removed from the motor vehicle if the second electronic panel 120 fails to operate during subsequent testing.

In summary, the complexity of new motor vehicles continues to require ever increasing complex instrument panels which continue to push their overall width dimension to greater values. In addition, if an electronic panel is installed as part of the instrument panel assembly after the instrument panel has been installed within the motor vehicle, if a function of the electronic panel fails to work during initial quality control testing, then the entire instrument panel assembly may have to be removed from the motor vehicle, thereby increasing costs and reducing productivity for the production of the motor vehicles. Therefore, an instrument panel and a method for installing an instrument panel assembly as one unit within the motor vehicle when the overall width of the instrument panel assembly is too wide to fit within the doorframe, would be desirable.

SUMMARY OF THE INVENTION

Disclosed herein is an instrument panel assembly affording for installment into a motor vehicle as one unit even though the assembly has a final assembly width that is greater than a predetermined maximum width criterion for passing the assembly through a doorframe. The instrument panel assembly includes an instrument panel having a front side and a rear side, the front side having a temporary attachment structure and a permanent attachment structure. The instrument panel assembly also includes an electronic panel with a temporary attachment structure and a permanent attachment structure, the electronic panel being operable to temporarily attach to the instrument panel in a position that affords for a reduced width of the instrument panel assembly. In this manner, the electronic panel can be temporarily attached to the instrument panel, subsequently tested for proper functioning and then installed as part of the instrument panel assembly within a motor vehicle.

In some instances, the instrument panel temporary attachment structure has at least one slot and the electronic panel temporary attachment structure has at least one tab. The at least one slot is dimensioned such that it will receive at least part of the at least one tab. In other instances, the instrument panel temporary attachment structure has at least two slots and the electronic panel temporary attachment structure has at least two tabs, the at least two slots dimensioned to receive at least part of the at least two tabs. The instrument panel can also include as part of the temporary attachment structure at least one non-circular aperture. If the at least one non-circular aperture is included as part of the instrument panel, the electronic panel can have a temporary attachment structure with at least one extension member that is dimensioned to slide at least partially within the at least one non-circular aperture. The at least one non-circular aperture can be a D-shaped aperture and the at least one extension member of the electronic panel temporary attachment structure can have a snap attachment member that is operable to removably attach the at least one extension member to the instrument panel.

Also disclosed is a process for installing an instrument panel assembly having an electronic panel that projects from an instrument panel beyond an undesirable width, when the electronic panel is attached in a final assembly position, such that the instrument panel assembly has a width that is greater than a predetermined maximum width criterion for passing the assembly through a doorframe. The process includes providing an instrument panel with a temporary positioning structure and a permanent positioning structure and providing an electronic panel with a temporary positioning structure and a permanent positioning structure. The electronic panel is temporarily attached to the temporary positioning structure of the instrument panel using the electronic panel temporary positioning structure. Thereafter, the instrument panel assembly is inserted through an open doorway of the motor vehicle and attached to the interior of the motor vehicle. After the instrument panel assembly is attached to the interior of the motor vehicle, the electronic panel is removed from the temporary positioning structure of the instrument panel and attached to the permanent positioning structure of the instrument panel.

BRIEF DESCRIPTION OF THE DRAWINGS

FIG. 10 is a front perspective view of an embodiment of the present invention after a center console has been attached thereto;

FIG. 11 is a flow chart illustrating a process embodiment of the present invention; and FIG. 12 is a flow chart illustrating another process embodiment of the present invention.

DETAILED DESCRIPTION OF THE INVENTION

Figure 1:
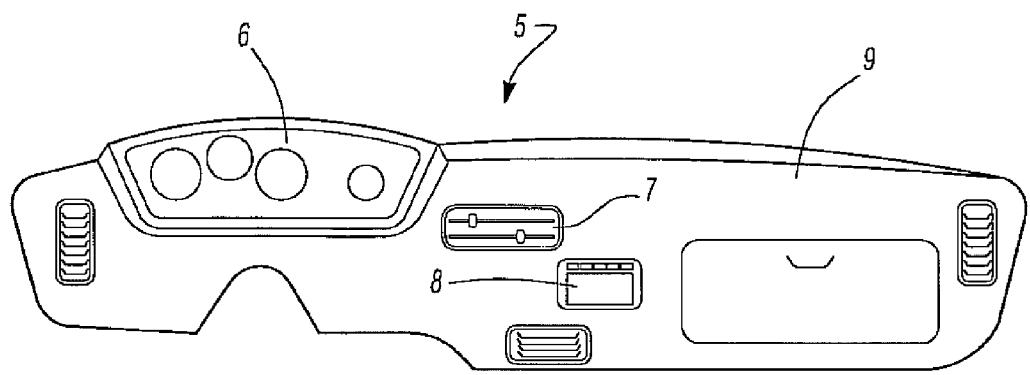
FIG. 1 is a front view of a prior art instrument panel assembly.
Figure 2:
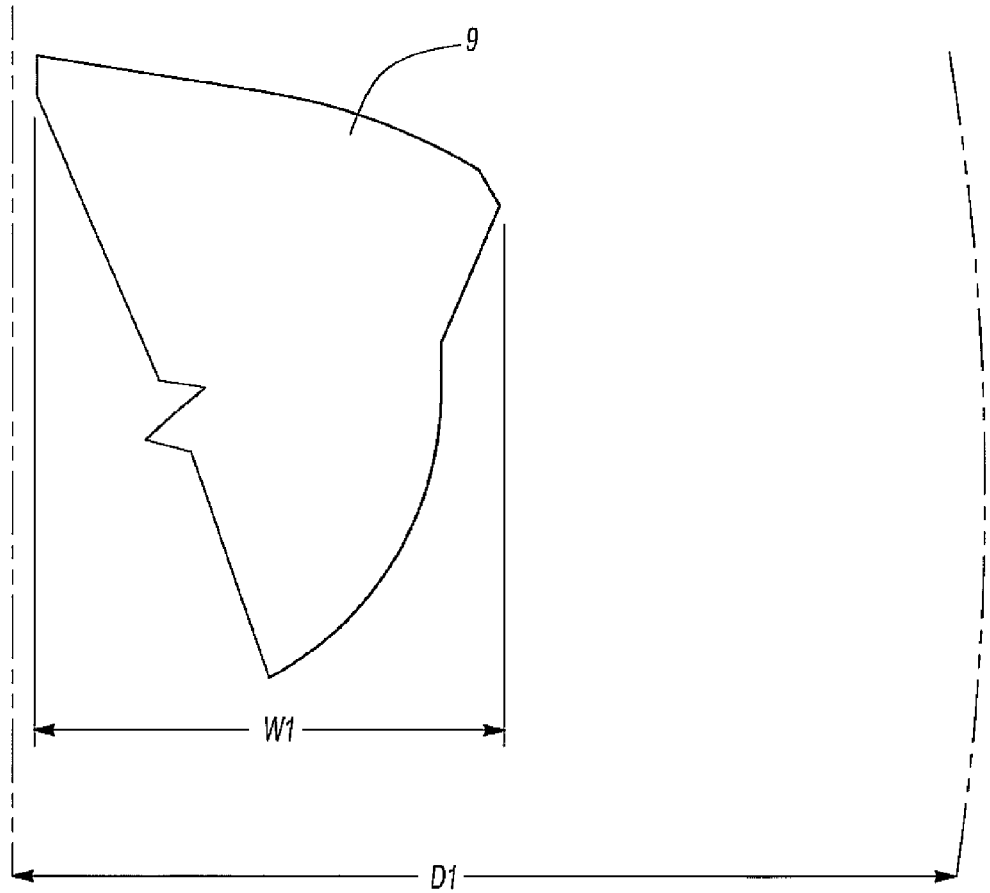
FIG. 2 is a side view of a prior art instrument panel assembly.

The present invention includes an instrument panel assembly that affords for passing the instrument panel assembly through a restricted doorframe space even though the assembly has a width that is greater than a predetermined maximum width criterion for passing the panel assembly through the doorframe. The instrument panel assembly includes an instrument panel with a temporary attachment structure that affords for the temporary attachment of an electronic panel to the instrument panel, the temporary assembly position of the electronic panel affording for a reduced width of the instrument panel assembly. In addition, the present invention discloses a method for installing the instrument panel assembly within a motor vehicle. As such, the instrument panel assembly and the method of installment have utility as a component for a motor vehicle and a method of installment.

The instrument panel assembly includes an instrument panel having an electronic panel that when attached thereto in a final assembly position has an overall width that is greater than an a predetermined maximum width criterion for passing the panel assembly through the doorframe. Thus, the instrument panel assembly affords for the installment of the instrument panel with the electronic panel as one unit into the motor vehicle by having a temporary attachment structure for the electronic panel.

The instrument panel has a front side and a rear side, the front side having a temporary attachment structure and a permanent attachment structure. The electronic panel has a backside that also has a temporary structure and a permanent attachment structure. In some instances, the instrument panel temporary attachment structure includes at least one slot and the electronic panel temporary attachment structure has at least one tab, or vice versa, with the at least one slot dimensioned to receive at least part of the at least one tab. In other instances, the instrument panel temporary attachment structure has at least two slots that are dimensioned to accept at least part of at least two tabs that are part of the electronic panel temporary attachment structure. The instrument panel temporary attachment structure can further include at least one non-circular aperture. In this instance, the electronic panel temporary attachment structure can include at least one extension member that is dimensioned to slide at least partially within the at least one non-circular aperture. The at least one non-circular aperture and the corresponding at least one extension member can be D-shaped. In addition, the at least one extension member can have a snap attachment member that is operable to removably attach the electronic panel to the instrument panel. The snap attachment member can also be operable to prevent the backside of the electronic panel from being positioned less than a predetermined distance adjacent to the instrument panel.

The present invention also includes a method for installing the instrument panel, the method including temporarily attaching the electronic panel to the instrument panel using the temporary attachment structures. Thereafter, the instrument panel assembly is passed through the open doorway and installed within the motor vehicle. After the instrument panel has been attached to the motor vehicle, the electronic panel is removed from its temporary assembly position and placed in a permanent assembly position using the permanent attachment structures of the instrument panel and the electronic panel. It is appreciated that the permanent assembly position electronic panel is the same as its final assembly position and is the position where the electronic panel will be located when the motor vehicle is fully assembled and ready for sale to a consumer. It is also appreciated that will after the electronic panel has been temporarily attached to the instrument panel, but before the instrument panel assembly has been installed within the motor vehicle, the electronic panel can be tested for proper operation, with any wiring, wire harness, etc. extending from the electronic panel and routed through the instrument panel. Thereafter, the instrument panel assembly can be installed with the wiring, wire harness, etc. extending from the electronic panel properly connected with the corresponding motor vehicle wiring.

Figure 5:
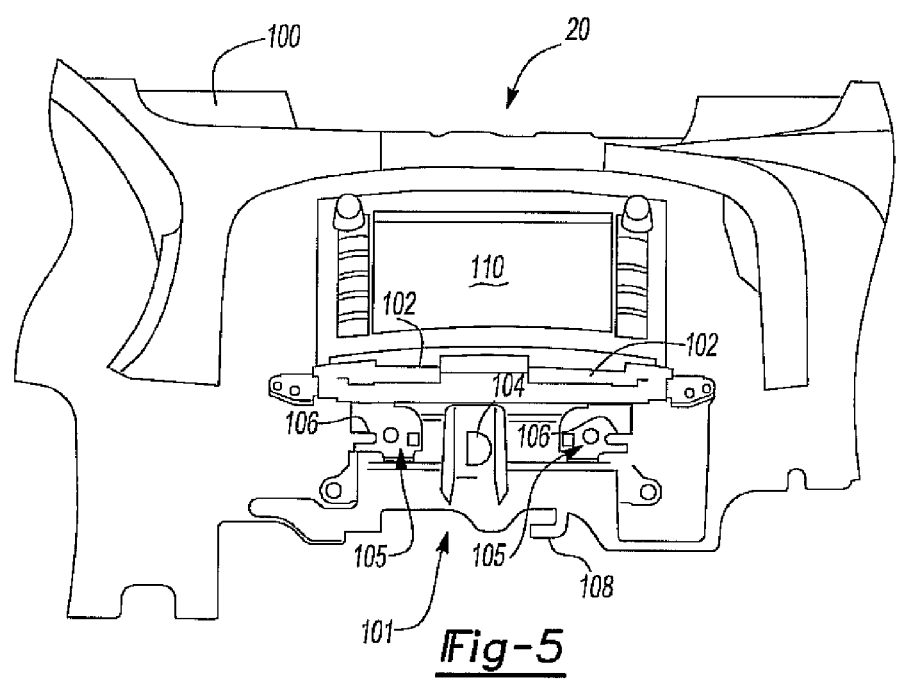
FIG. 5 is a front view of an embodiment of the present invention.

Turning now to FIG. 5, an instrument panel assembly according to an embodiment of the present invention is shown generally at reference numeral 20. The instrument panel assembly 20 can include an instrument panel 100 with a temporary attachment structure 101, the temporary attachment structure 101 including at least one slot 102. In some instances, the temporary attachment structure 101 can include at least two slots 102 and a non-circular aperture 104. As shown in FIG. 5 for illustrative purposes only, the non-circular aperture 104 can be D-shaped. In addition to the temporary attachment structure 101, a permanent attachment structure 105 is present, the structure 105 having a permanent attachment slot 106. Optionally included as part of the instrument panel 100 can be an L-shaped bracket 108, the L-shaped bracket 108 operable for the placement and temporarily holding of wires, a wire harness and the like. The instrument panel assembly 20 can also include a first electronic panel 110 that is located at its final assembly position.

Figure 6:
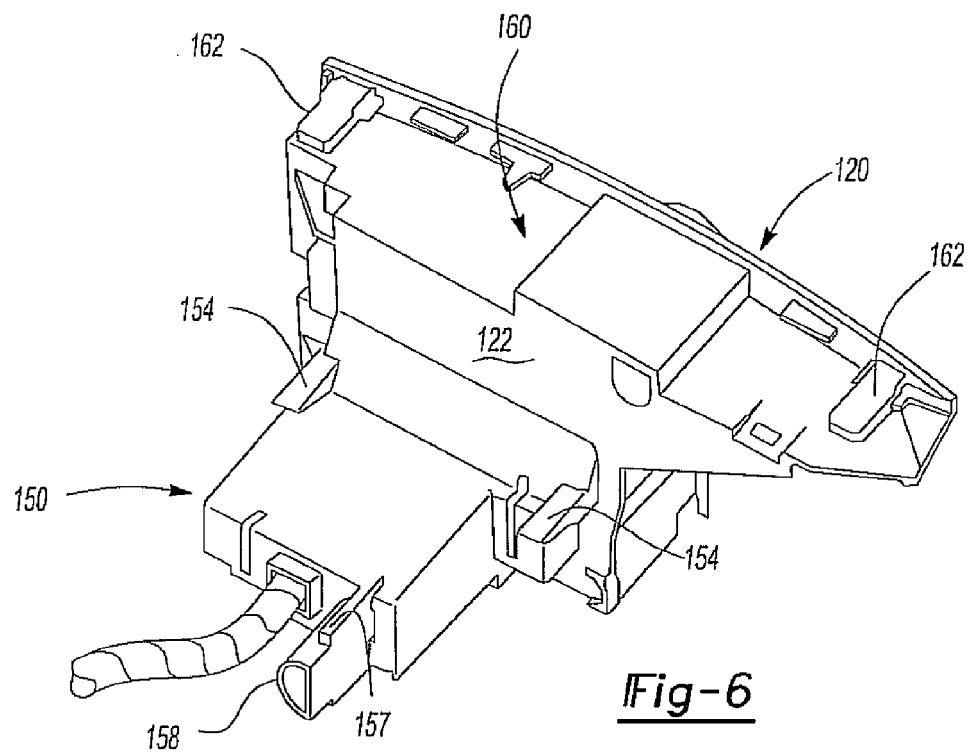
FIG. 6 is a rear perspective view of an electronic panel for an embodiment of the present invention.

Turning now to FIG. 6, the backside of a second electronic panel 120 is illustratively shown, the backside having a temporary attachment structure 150 and a permanent attachment structure 160. The temporary attachment structure 150 can include a tab 154, with the tab 154 dimensioned to fit at least partially within the slot 102 of the instrument panel 100. In addition, the temporary attachment structure 150 can include an extension member 158 that is dimensioned to slide at least partially within the non-circular aperture 104 of the instrument panel 100. It is appreciated that the temporary attachment structure 101 of the instrument panel 100 can be part of the first electronic panel 110. The extension member 158 can include a snap attachment member 157, the snap attachment member 157 operable to snap or removably attach the extension member 158 at least partially within the non-circular aperture 104.

Figure 4:
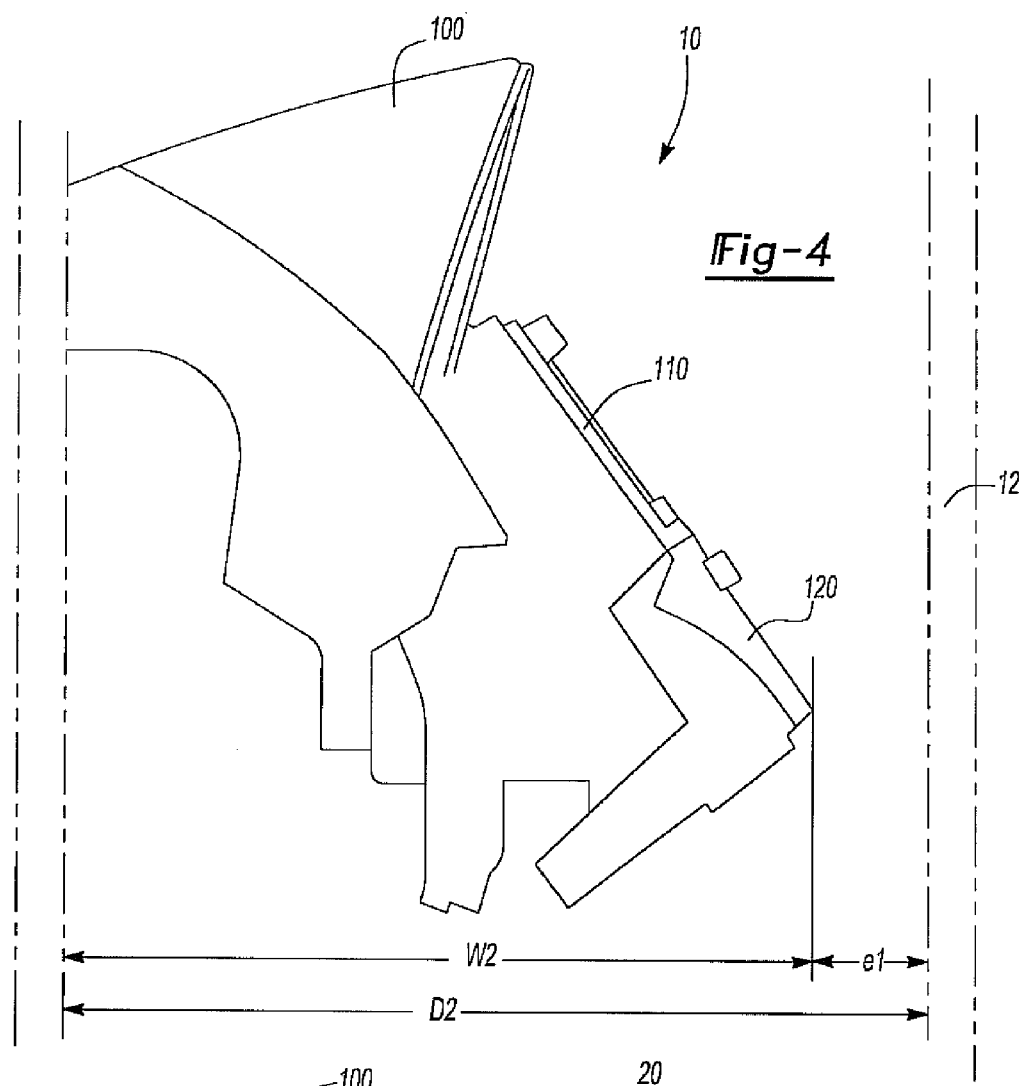
FIG. 4 is a side view of the instrument panel assembly shown in FIG. 3.
Figure 7:
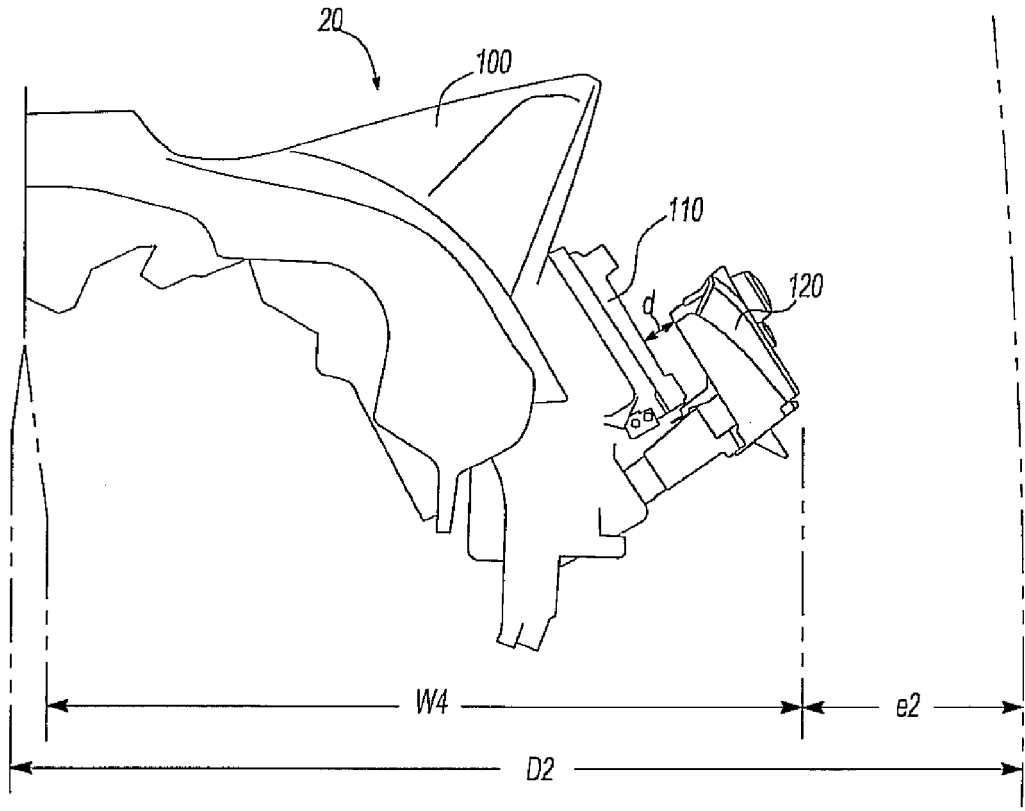
FIG. 7 is a side view of an embodiment of the present invention.

Turning now to FIG. 7, a side view of the instrument panel assembly 20 is shown wherein the second electronic panel 120 is located at a temporary assembly position relative to the instrument panel 100. The second electronic panel 120 is temporarily attached to the instrument panel 100 using the temporary attachment structure 101 of the instrument panel 100 and the temporary attachment structure 150 of the second electronic panel 120. As shown in this figure, the overall width W4 of the instrument panel assembly 10 has been reduced when compared to W2 in FIG. 4 by placement of the second electronic panel 120 in its temporary assembly position. As such, the distance between the edge of the instrument panel assembly 20 shown in this figure and the doorway has been increased from e1 to e2. It is appreciated that the width e2 is greater than or equal to a predetermined minimum clearance criterion typically set-forth by an assembly line facility that assembles the motor vehicle. Also shown in this figure, is a dimension d that is afforded between a back panel 122 of the second electronic panel 120 and the front of the first electronic panel 110. This distance d can be desirable if the second electronic panel 120 is impacted while it is in its temporary assembly position. Impact of the second electronic panel 120 while it is temporarily attached to the instrument panel 100 can result in movement of the panel 120, with the distance d affording for such movement without contacting the first electronic panel 100. In this manner, damage to the first electronic panel 110 in the form of scratches, dents and the like can be avoided.

Figure 8:
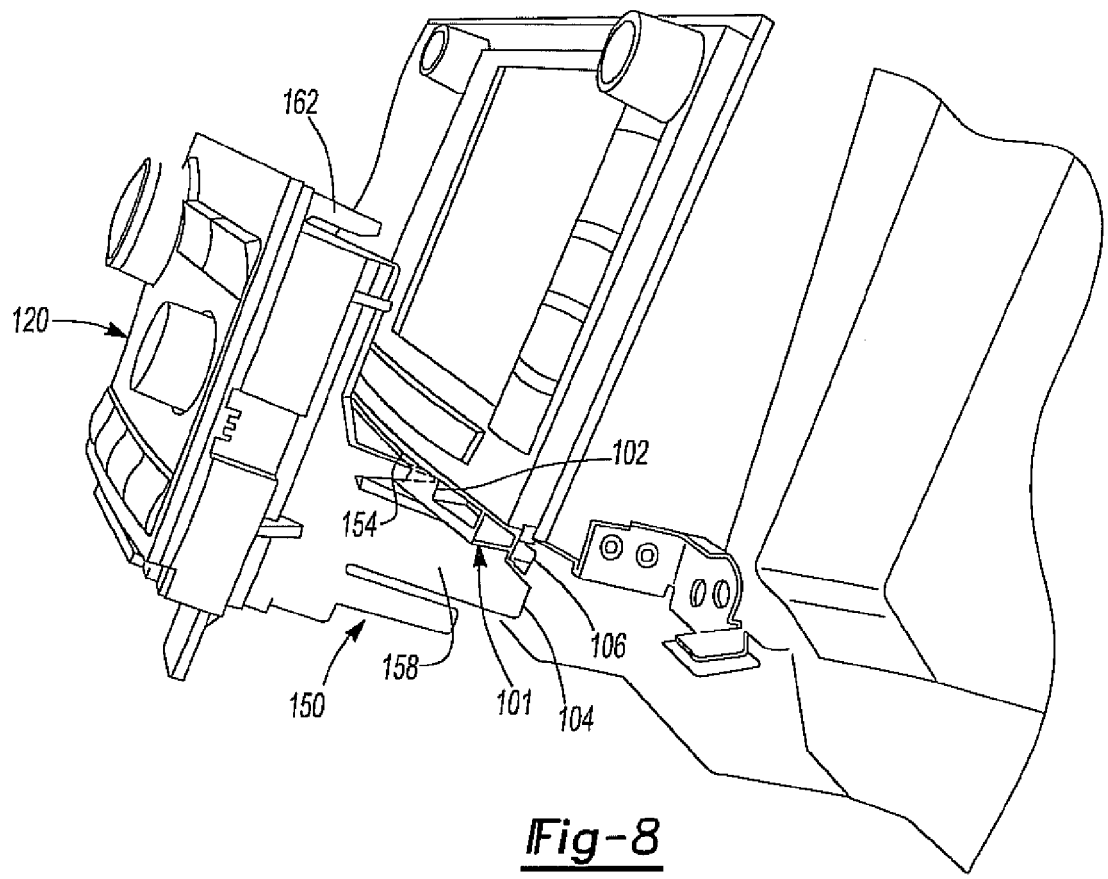
FIG. 8 is a side perspective view of an embodiment of the present invention.

A side perspective view of the second electronic panel 120 temporarily attached to the instrument panel 100 is shown in FIG. 8. The second electronic panel 120 is temporarily attached to the instrument panel 100 using the temporary attachment structures 101 and 150, respectively. In particular, the tab 154 is inserted at least partially within the slot 102 and the extension member 158 is slid into the non-circular aperture 104.

Figure 3:
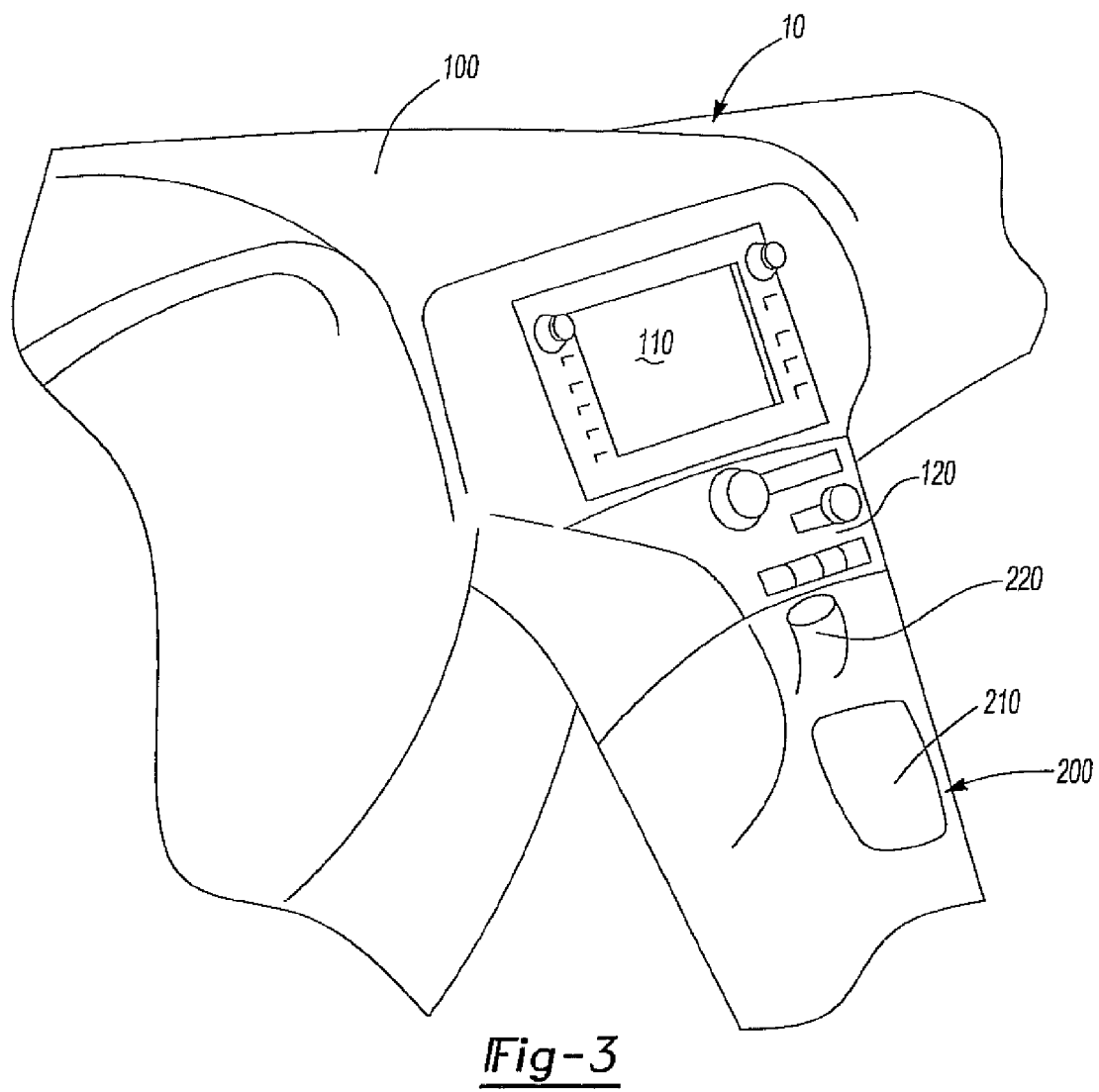
FIG. 3 is a perspective view of a instrument panel assembly with a center console attached thereto.
Figure 9:
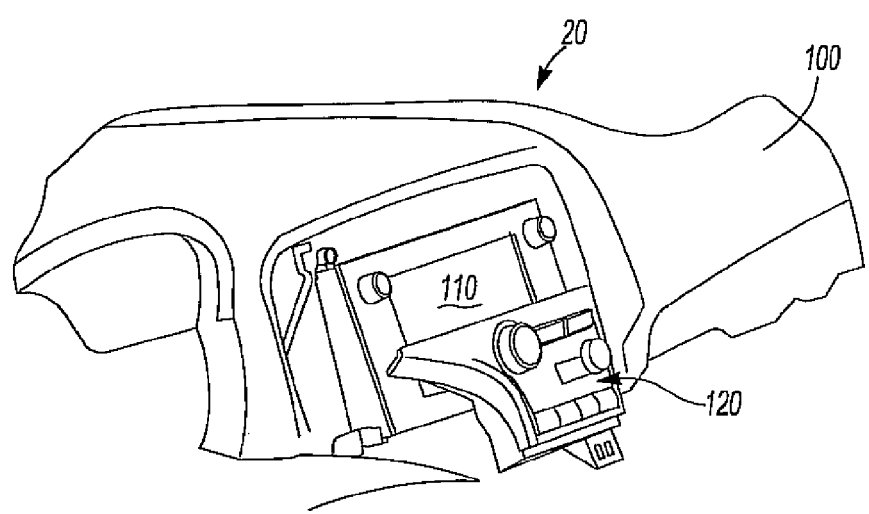
FIG. 9 is a front perspective view of an embodiment of the present invention after being installed within a motor vehicle.

Turning now to FIG. 9, a perspective view of the instrument panel assembly 20 after it has been attached to the interior of the motor vehicle is shown. As obvious from the figure, the second electronic panel 120 is still located in the temporary assembly position which can afford for the installment of a center console 200, as shown in FIG. 10. In the alternative, the center console 200 can be installed after the second electronic panel 120 has moved from the temporary assembly position to the permanent assembly position. The center console 200 can include at least one panel 210 that has a leading edge 212 to be at least partially covered by the second electronic panel 120 as shown in FIG. 3. Thus, in addition to affording for the instrument panel assembly 20 to be passed through an open doorway, the temporary attachment structures of the instrument panel 100 and the second electronic panel 120 afford for installment of the center console 200 such that unsightly and undesirable edges of the center console 200 can be covered when the second electronic panel 120 is placed in its final assembly position.

Materials used for the production of instrument panels are known to those skilled in the art, illustratively including various types of polymers, metals, alloys and combinations thereof. In addition, the first electronic panel 110 and the second electronic panel 120 can be any type of electronic panel used within a motor vehicle. In some instances, the first electronic panel 110 can be a navigation system, a radio, a CD player, and combinations thereof, and the second electronic panel 120 can be a heating, venting, and air conditioning (HVAC) control system. It is appreciated that the temporary attach structure(s) of the instrument panel 100 and the second electronic panel 120 can be any structure that affords for the temporary attachment of the second electronic panel 120 to the instrument panel 100, illustratively including tabs, slots, rods, apertures, adhesives, magnets, snaps, buttons, brackets, hook and loop fasteners and combinations thereof.

A method for installing the inventive instrument panel assembly 10 is shown illustratively in FIG. 11. The method or process 30 includes providing an instrument panel at step 300 and an electronic panel at step 310. It is appreciated that the instrument panel provided at step 300 includes an instrument panel having a temporary attachment structure and a permanent attachment structure as disclosed above. Likewise, the electronic panel provided at step 310 includes a temporary attachment structure and a permanent attachment structure as disclosed above. After the instrument panel and the electronic panel have been provided, the electronic panel is assembled in a temporary assembly position at step 320. Thereafter, the instrument panel with the electronic panel temporarily attached thereto is installed in the motor vehicle at step 330 with the electronic panel thereafter removed from its temporary assembly position and installed at its permanent assembly position at step 340.

Turning now to FIG. 12, another embodiment of a method to install the instrument panel assembly disclosed herein is shown generally at reference numeral 40. In this embodiment, the instrument panel is again provided at step 300 and the electronic panel is provided at step 310. Likewise, the electronic panel is assembled with respect to the instrument panel in the temporary assembly position at step 320. Thereafter, and before the instrument panel assembly is installed within the motor vehicle, the instrument panel assembly is tested at step 322 for proper operational functionality. If the electronic panel is faulty and fails testing at step 324, the electronic panel can be replaced before the instrument panel assembly has been installed within the motor vehicle at step 326. In this manner, excess time and loss of productivity can be avoided. After the electronic panel has been replaced and assembled in the temporary assembly position at step 320, the instrument panel can be tested again at step 322. Upon passing the testing requirement(s), the instrument panel assembly with the electronic panel in its temporary assembly position can be installed within the motor vehicle at step 330. Thereafter, and optionally if a center console is attached to the instrument panel, the electronic panel is removed from its temporary assembly position and assembled in its final or permanent assembly position at step 340. In this manner, an instrument panel having a final assembly width that is greater than a predetermined maximum width criterion is provided for installment in the motor vehicle.

The foregoing drawings, discussion and description are illustrative of specific embodiments of the present invention, but they are not meant to be limitations upon the practice thereof. Numerous modifications and variations of the invention will be readily apparent to those of skill in the art in view of the teaching presented herein. It is the following claims, including all equivalents, which define the scope of the invention.

I claim:

1. An instrument panel assembly having a temporary overall width for facilitating installment of said instrument panel assembly in a vehicle, said instrument panel assembly comprising:
   an instrument panel and an electronic panel, said instrument panel having a front side and a rear side, said front side having a temporary attachment structure for temporarily attaching said electronic panel thereto and a permanent attachment structure for permanently attaching said electronic panel thereto; and
   said electronic panel having a temporary attachment structure for temporarily attaching to said instrument panel and a permanent attachment structure for permanently attaching to said instrument panel;
   wherein said instrument panel assembly has a first overall width when said electronic panel is temporarily attached to said instrument panel and a second overall width when said electronic panel is permanently attached to said instrument panel; and
   said first overall width is less than said second overall width.

2. The instrument panel assembly of claim 1, wherein said instrument panel temporary attachment structure has at least one slot and said electronic panel temporary attachment structure has at least one tab, said at least one slot dimensioned to receive at least part of said at least one tab.

3. The instrument panel assembly of claim 2, wherein said instrument panel temporary attachment structure has at least two slots and said electronic panel temporary attachment structure has at least two tabs, each of said at least two slots dimensioned to receive at least part of one of said at least two tabs.

4. The instrument panel assembly of claim 1, wherein said instrument panel temporary attachment structure has at least one non-circular aperture and said electronic panel temporary attachment structure has at least one extension member, said at least one extension member dimensioned to slide at least partially within said at least one non-circular aperture.

5. The instrument panel assembly of claim 4, wherein said at least one non-circular aperture is D-shaped.

6. The instrument panel assembly of claim 4, wherein said at least one extension member has a snap attachment member operable to removably attach said at least one extension member to said instrument panel.

7. The instrument panel assembly of claim 1, wherein said electronic panel is a first electronic panel and a second electronic panel, said second electronic panel having said temporary attachment structure for temporarily attaching to said instrument panel and said permanent attachment structure for permanently attaching to said instrument panel; and
   said instrument panel assembly having said first overall width when said second electronic panel is temporarily attached to said instrument panel and said second overall width when said second electronic panel is permanently attached to said instrument panel.

8. The instrument panel assembly of claim 7, wherein said second electronic panel has a back panel, said back panel spaced apart a predetermined distance from a front surface of said first electronic panel when said second electronic panel is temporarily attached to said instrument panel, for the purpose of preventing said back panel of said second electronic panel from contacting said front surface of said first electronic panel when said instrument panel assembly is being installed in the vehicle.

9. An instrument panel assembly having a temporary overall width for facilitating installment of said instrument panel assembly in a vehicle, said instrument panel assembly comprising:
   an instrument panel and an electronic panel, said instrument panel having a front side and a rear side, said front side having a temporary attachment structure for temporarily attaching said electronic panel thereto and a permanent attachment structure for permanently attaching said electronic panel thereto;
   said instrument panel temporary attachment structure having at least two slots; and
   said electronic panel having a temporary attachment structure for temporarily attaching to said instrument panel and a permanent attachment structure for permanently attaching to said instrument panel;
   said electronic panel temporary attachment structure having at least two tabs dimensioned to slide at least partially into said at least two slots of said instrument panel temporary attachment structure;
   wherein said instrument panel assembly has a first overall width when said electronic panel is temporarily attached to said instrument panel and a second overall width when said electronic panel is permanently attached to said instrument panel; and
   said first overall width is less than said second overall width.

10. The instrument panel assembly of claim 9, wherein said instrument panel temporary attachment structure has at least one non-circular aperture and said electronic panel temporary attachment structure has at least one extension member, said at least one extension member dimensioned to slide at least partially within said at least one non-circular aperture.

11. The instrument panel assembly of claim 10, wherein said at least one non-circular aperture is D-shaped.

12. The instrument panel assembly of claim 10, wherein said at least one extension member has a snap attachment member operable to removably attach said at least one extension member to said instrument panel.

13. The instrument panel assembly of claim 9, wherein said electronic panel is a first electronic panel and a second electronic panel, said second electronic panel having said temporary attachment structure for temporarily attaching to said instrument panel and said permanent attachment structure for permanently attaching to said instrument panel; and
   said instrument panel assembly having said first overall width when said second electronic panel is temporarily attached to said instrument panel and said second overall width when said second electronic panel is permanently attached to said instrument panel.

14. The instrument panel assembly of claim 13, wherein said second electronic panel has a back panel, said back panel spaced apart a predetermined distance from a front surface of said first electronic panel when said second electronic panel is temporarily attached to said instrument panel, for the purpose of preventing said back panel of said second electronic panel from contacting said front surface of said first electronic panel when said instrument panel assembly is being installed in the vehicle.

* * * * *